US008634669B2

United States Patent
Auyeung et al.

(10) Patent No.: US 8,634,669 B2
(45) Date of Patent: Jan. 21, 2014

(54) FAST IMPLEMENTATION OF CONTEXT SELECTION OF SIGNIFICANCE MAP

(75) Inventors: Cheung Auyeung, Sunnyvale, CA (US); Wei Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 13/349,267

(22) Filed: Jan. 12, 2012

(65) Prior Publication Data

US 2012/0183236 A1     Jul. 19, 2012

Related U.S. Application Data

(60) Provisional application No. 61/432,483, filed on Jan. 13, 2011, provisional application No. 61/432,506, filed on Jan. 13, 2011.

(51) Int. Cl.
| | | |
|---|---|---|
| *G06K 9/36* | (2006.01) | |
| *G06K 9/46* | (2006.01) | |
| *H04B 1/66* | (2006.01) | |
| *H04N 11/02* | (2006.01) | |

(52) U.S. Cl.
USPC ............. 382/238; 382/232; 375/240.12

(58) Field of Classification Search
USPC ......... 382/232, 238–240; 375/240.12, 240.18
See application file for complete search history.

(56) References Cited

U.S. PATENT DOCUMENTS

| | | |
|---|---|---|
| 6,760,481 B1 | 7/2004 | Chebil et al. |
| 6,917,711 B1 | 7/2005 | Wang et al. |
| 7,181,075 B2 | 2/2007 | Nakahara |
| 7,379,608 B2 | 5/2008 | Marpe et al. |
| 2005/0002457 A1 | 1/2005 | Xu et al. |
| 2008/0267513 A1 | 10/2008 | Sankaran |
| 2012/0082233 A1* | 4/2012 | Sze et al. ................. 375/240.18 |
| 2012/0082235 A1* | 4/2012 | Lou et al. ................. 375/240.18 |
| 2013/0058407 A1* | 3/2013 | Sole Rojals et al. ..... 375/240.12 |

FOREIGN PATENT DOCUMENTS

WO    2011022043 A1    2/2011

OTHER PUBLICATIONS

Vivienne Sze et al. "Parallelization of HHI Transform Coding" Oct. 2010, Guangzhou, China.*
Tung Nguyen et al., "Improved Context Modeling for Coding Quantized Transform Coefficients in Video Compression", 28th Picture Coding Symposium PCS2010, Dec. 8-10, 2012, Nagoya, Japan, pp. 378-381. Fraunhofer Institute for Telecommunications, Heinrich Hertz Institute, Image Processing Department, Einsteinufer 37, D-10587 Berlin, Germany and Image Communications Chair, Department of Telecommunication Systems, Technical University of Berlin, Einsteinufer 17, D-10587 Berlin, Germany.

* cited by examiner

*Primary Examiner* — Li Liu
(74) *Attorney, Agent, or Firm* — Haverstock & Owens LLP

(57) ABSTRACT

A fast implementation context selection of a significance map includes caching the significance of each coefficient in a buffer, storing an extended significance map in an extended buffer and updating the extended significance map after the significance of a transform coefficient is determined by the encoder or the decoder.

8 Claims, 7 Drawing Sheets

US 8,634,669 B2

FAST IMPLEMENTATION OF CONTEXT SELECTION OF SIGNIFICANCE MAP

CROSS-REFERENCE TO RELATED APPLICATION(S)

This application claims priority under 35 U.S.C. §119(e) of the U.S. Provisional Patent Application Ser. No. 61/432,483, filed Jan. 13, 2011 and titled, "A fast implementation of context selection of significance map" and the U.S. Provisional Patent Application Ser. No. 61/432,506, filed Jan. 13, 2011 and titled, "Parallel Processing Friendly Simplified Context Selection of Significance Map." The U.S. Provisional Patent Application Ser. No. 61/432,483, filed Jan. 13, 2011 and titled, "A fast implementation of context selection of significance map" and the U.S. Provisional Patent Application Ser. No. 61/432,506, filed Jan. 13, 2011 and titled, "Parallel Processing Friendly Simplified Context Selection of Significance Map" are both also hereby incorporated by reference in their entireties for all purposes.

FIELD OF THE INVENTION

The present invention relates to the field of image processing. More specifically, the present invention relates to context selection.

BACKGROUND OF THE INVENTION

Context selection of a significance map has been implemented with several redundancies and dependencies. For example, context selection has been implemented to re-compute the significance of a coefficient multiple times and to have many branches to determine which pixel should be included in the context selection according to the scan direction and boundary conditions.

SUMMARY OF THE INVENTION

A fast implementation context selection of a significance map includes caching the significance of each coefficient in a buffer, storing an extended significance map in an extended buffer and updating the extended significance map after the significance of a transform coefficient is determined by the encoder or the decoder.

In one aspect, a method of implementing context selection of a significance map programmed in a memory of a device. The method comprises selecting a five point neighborhood of a position, if a point in the five point neighborhood of the position is outside the significance map, assuming a significance of the point to be zero, computing a sum of the significance of a subset of the five point neighborhood and determining a context based on the sum. The five point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts. The five point neighborhood of the position includes a first pixel to the right of the position, a second pixel to the right of the first pixel, a third pixel below the first pixel, a fourth pixel below the position and a fifth pixel below the fourth pixel. The five point neighborhood of the position includes a first pixel to the left of the position, a second pixel to the left of the first pixel, a third pixel above the first pixel, a fourth pixel above the position and a fifth pixel above the fourth pixel.

In another aspect, a method of implementing context selection of a significance map programmed in a memory of a device. The method comprises selecting a multi-point neighborhood of a position, if a point in the multi-point neighborhood of the position is outside the significance map, assuming a significance of the point to be zero, computing a sum of the significance of a subset of the multi-point neighborhood and determining a context based on the sum. The multi-point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts. The multi-point neighborhood of the position includes a first pixel to the right of the position, a second pixel to the right of the first pixel, a third pixel below the first pixel, a fourth pixel below the position and a fifth pixel below the fourth pixel. The multi-point neighborhood of the position includes a first pixel to the left of the position, a second pixel to the left of the first pixel, a third pixel above the first pixel, a fourth pixel above the position and a fifth pixel above the fourth pixel.

In another aspect, a method of implementing context selection of a significance map programmed in a memory of a device comprises caching a significance of coefficients in an extended buffer, storing an extended significance map in the extended buffer and updating the extended significance map after the significance of a transform coefficient is determined. The significance of the transform coefficient is determined by an encoder. The significance of the transform coefficient is determined by a decoder. The context selection is based on a sum of a subset of neighboring pixels. The context of the significance of the subset of the pixels along a diagonal line in scan order is computed in parallel. The extended buffer is initialized to zero. The extended significance map is stored in a bit map. The extended significance map is stored in an array. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for caching a significance of coefficients in an extended buffer, storing an extended significance map in the extended buffer and updating the extended significance map after the significance of a transform coefficient is determined and a processing component coupled to the memory, the processing component configured for processing the application. The significance of the transform coefficient is determined by an encoder. The significance of the transform coefficient is determined by a decoder. The context selection is based on a sum of a subset of neighboring pixels. The context of the significance of the subset of the pixels along a diagonal line in scan order is computed in parallel. The extended buffer is initialized to zero. The extended significance map is stored in a bit map. The extended significance map is stored in an array. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an encoder comprises a memory for storing an application, the application for caching a significance of coefficients in an extended buffer, storing an extended significance map in the extended buffer and updating the extended significance map after the significance of a transform coefficient is determined and a processing component coupled to the memory, the processing component configured for processing the application. The context selection is based on a sum of a subset of neighboring pixels. The context of the significance of the subset of the pixels along a diagonal line in scan order is computed in parallel. The extended buffer is initialized to zero.

In yet another aspect, a decoder comprises a memory for storing an application, the application for caching a significance of coefficients in an extended buffer, storing an extended significance map in the extended buffer and updating the extended significance map after the significance of a transform coefficient is determined and a processing component coupled to the memory, the processing component configured for processing the application. The context selection is based on a sum of a subset of neighboring pixels. The context of the significance of the subset of the pixels along a diagonal line in scan order is computed in parallel. The extended buffer is initialized to zero.

DETAILED DESCRIPTION OF THE PREFERRED EMBODIMENT

In the MPEG-4 AVC Standard, non-zero coefficient locations are encoded by means of a significance map. The significance map in the MPEG-4 AVC Standard works as follows. If the coded_block_flag indicates that a block has significant_coefficients, then a binary-valued significance map is encoded. For each coefficient in scanning order, a one-bit symbol significant_coeff_flag is transmitted. If the significant_coeff_flag symbol is one, e.g., if a nonzero coefficient exists at this scanning position, then a further one-bit symbol last_significant_coeff_flag is sent. This symbol indicates if the current significant_coefficient is the last one inside the block or if further significant coefficients follow. The flags (significant_coeff_flag, last_significant_coeff_flag) for the last scanning position of a block are not transmitted. If the last scanning position is reached and the significance map encoding was not already terminated by a last_significant_coeff_flag with a value of one, then the last coefficient is significant.

Figure 1:
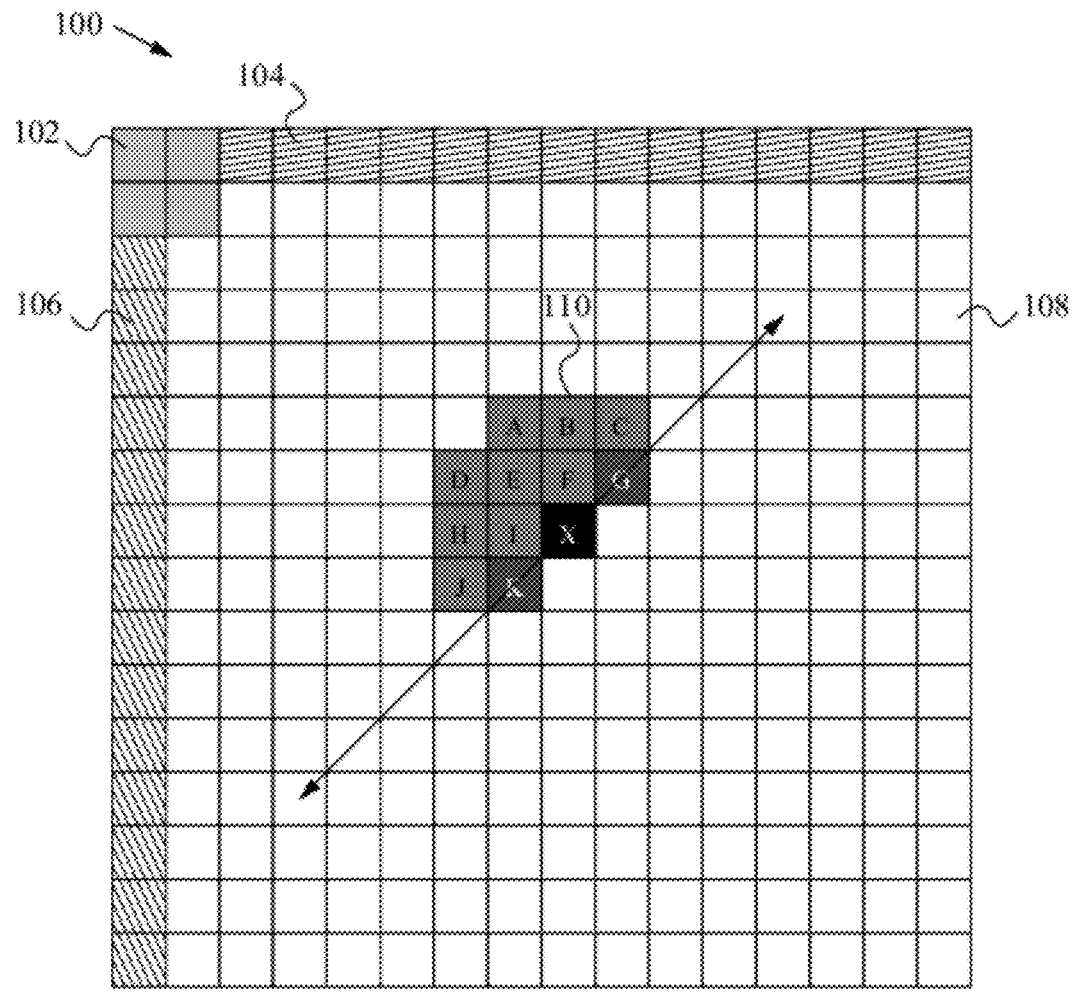
FIG. 1 illustrates a diagram of a context of a significance map according to some embodiments.

Similar to MPEG-4 AVC, High Efficiency Video Coding (HEVC) is also able to implement significance maps. In previous implementations, HHI_TRANSFORM_CODING implemented a highly adaptive context selection approach for a significance map of 16×16 and 32×32 transform coefficients. For instance, in FIG. 1, a 16×16 block 100 is divided into four regions where each position in region 102 has its context, region 104 shares 3 contexts, region 106 shares another 3 contexts and region 108 shares 5 contexts. As shown in FIG. 1, the context selection of X is able to depend on the significance of the transform coefficients in the neighboring positions A to K. A context mask 110 includes pixels near position X. In general, the context is based on the sum of a subset of position A to K, wherein the subset is able to include the set. In some embodiments, the context is based on the half of the sum of the significance of position A to K.

```
UInt TComTrQuant::getSigCtxInc   ( Tcoeff*    pcCoeff,
                                   const UInt uiPosX,
                                   const UInt uiPosY,
                                   const UInt uiLog2BlkSize,
                                   const UInt uiStride,
                                   const bool bDownleft )
{
  UInt   uiCtxInc = 0;
  UInt   uiSizeM1 = ( 1 << uiLog2BlkSize ) - 1;
  ...
  ...
  ...
  {
     const int* pData = &pcCoeff[uiPosX + uiPosY * uiStride];
     int        iStride = uiStride;
     int        iStride2=iStride <<1;
     UInt       uiCnt=(pData[-iStride] ? 1 : 0);
     uiCnt      +=(pData[-1] ? 1 : 0);
     uiCnt      +=(pData[-1 -iStride] ? 1 : 0);
     if (uiPosX > 1) //dependency on boundary
     {
        uiCnt   += (pData[-2] ? 1 : 0);
        uiCnt   += (pData[-2 -iStride] ? 1 : 0);
        if (uiPosY < uiSizeM1) // dependency on boundary
        {
           uiCnt += (pData[-2 +iStride] ? 1 : 0);
        }
     }
     if (uiPosY > 1) //dependency on boundary
     {
        uiCnt   += (pData[-iStride2] ? 1 : 0);
        uiCnt   += (pData[-1 -iStrides] ? 1 : 0);
        if (uiPosX < uiSizeM1) // dependency on boundary
        {
           uiCnt += (pData[1 -iStride2] ? 1 : 0);
        }
     }
     if (bDownLeft) // dependency on scan direction
     {
        if (uiPosX < uiSizeM1) // dependency on boundary
        {
           uiCnt += (pData[1 -iStride] ? 1 : 0);
        }
        else
        {
           if (uiPosY < uiSizeM1) // dependency on boundary
           {
              uiCnt += (pData[1 -iStride] ? 1 : 0);
           }
        }
     }
     uiCtxInc = 10 + min<UInt>(4, (uiCnt+1) >> 1);
  }
  return uiCtxInc;
}
```

The implementation of the context selection of significant map above has several redundancies and dependencies. The code above shows that the significance of a coefficient is re-computed multiple times, and there are many branches to determine which pixel should be included in the context selection according to the scan direction and boundary conditions.

The code below shows a faster implementation of significance map context selection.

```
UInt TComTrQuant::getSigCtxInc    ( const UInt     uiPosX,
                                    const UInt     uiPosY,
                                    const UInt     uiLog2BlkSize,
                                    const UChar*   sigBitMap)
{
    UInt  uiCtxInc = 0;
    const Uchar* pSigBitMap = &sigBitMap[uiPosY*64+uiPosX];
    if (uiLog2BlkSize <= 3)
    {
        UInt uiShift = max<UInt>(0,uiLog2BlkSize – 2);
        uiCtxInc = ( (uiPosY >> uiShift) << 2) + (uiPosX >> uiShift);
    }
    else
    {
        if (uiPosX <= 1 && uiPosY <=1)
        {
            uiCtxInc = (uiPosY << 1) + uiPosX;
        }
        else
        {
            if (uiPosY == 0)
            {
                UInt uiCnt2 = pSigBitMap[–2] + pSigBitMap[–1];
                uiCnt2 += pSigBitMap[64*1–2] + pSigBitMap[64*1–1];
                uiCtxInc = 4 + ((uiCnt2 + 1) >> 1);
            }
            else if (uiPosX == 0)
            {
                UInt uiCnt2 = pSigBitMap [–64*2] + pSigBitMap[–64*2+1];
                uiCnt2 += pSigBitMap[–64] + pSigBitMap[64*1+1];
                uiCtxInc = 7 + ((uiCnt2 + 1) >> 1);
            }
            else
            {
                UInt uiCnt2 = pSigBitMap [–64*2–1] +
                              pSigBitMap[–64*2+0] + pSigBitMap[–64*2+1];
                uiCnt2 += pSigBitMap[–64] + pSigBitMap[64*1+1] +
                          pSigBitMap[–64*1+0] + pSigBitMap[–64*1+1];
                uiCnt2 += pSigBitMap[–2] + pSigBitMap[–1];
                uiCnt2 += pSigBitMap[64*1–2] + pSigBitMap[64*1–1];
                uiCtxInc = 10 + min<UInt>(4, (uiCnt2 + 1) >> 1);
            }
        }
    }
    return uiCtxInc;
}
```

Figure 2:
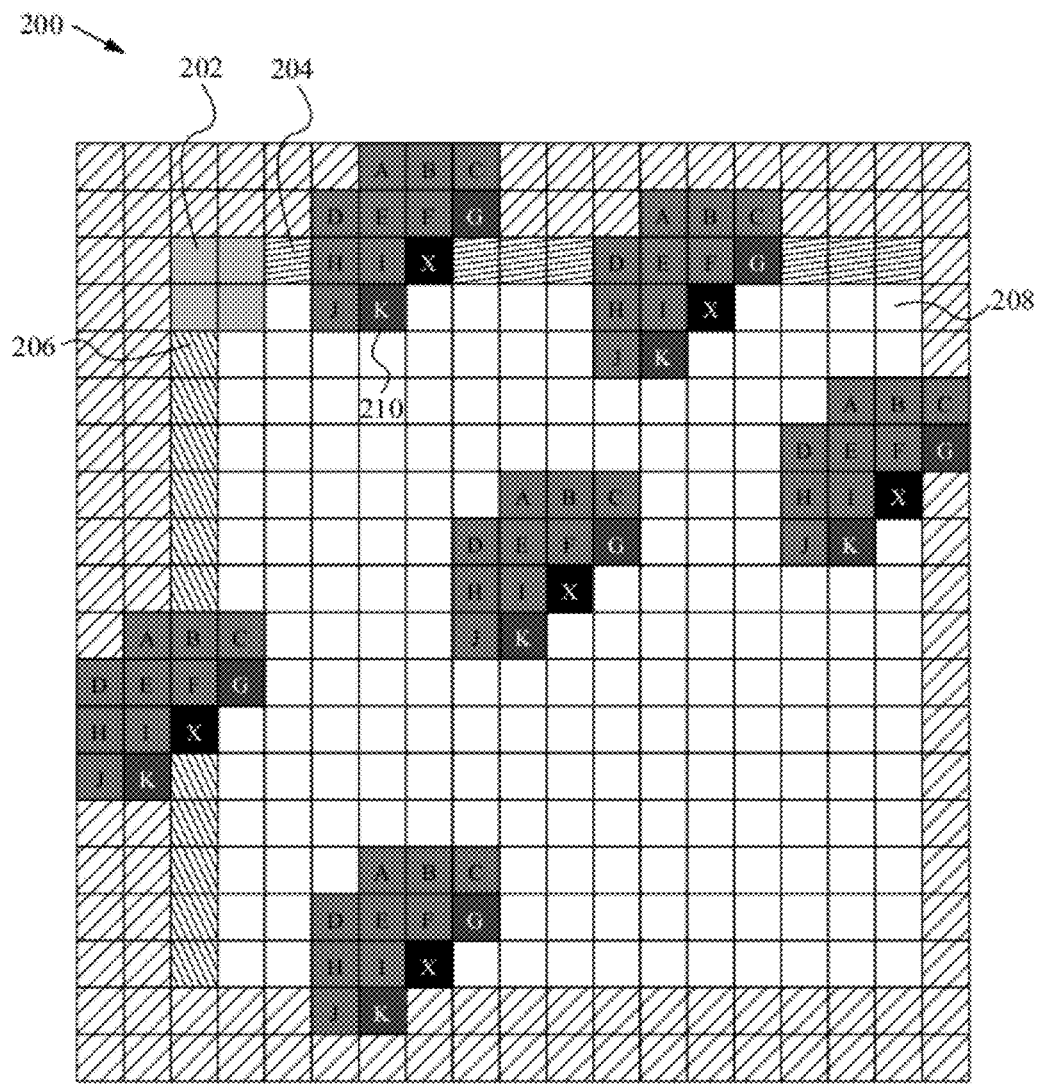
FIG. 2 illustrates a diagram of a significance map embedded in an extended significance map according to some embodiments.

The speedup is a result of the following implementation modifications:
1) to avoid the redundant calculation, the significance of each coefficient is cached in the buffer bSigBitMap;
2) to reduce the number of branches for detecting boundary conditions, the buffer bSigBitMap is extended to a larger buffer, which is initialized to zero as shown in FIG. 2;
3) the extended significance map is updated after the significance of a transform coefficient is determined by the encoder or the decoder.

FIG. 2 illustrates a diagram of a significance map embedded in a larger significance map according to some embodiments. The larger significance map 200 (e.g. 20 pixels×19 pixels) includes region 202 where each position has its context, region 204 shares 3 contexts, region 206 shares another 3 contexts and region 208 shares 5 contexts. The larger significance map 200 includes multiple context masks 210.

Figure 3A:
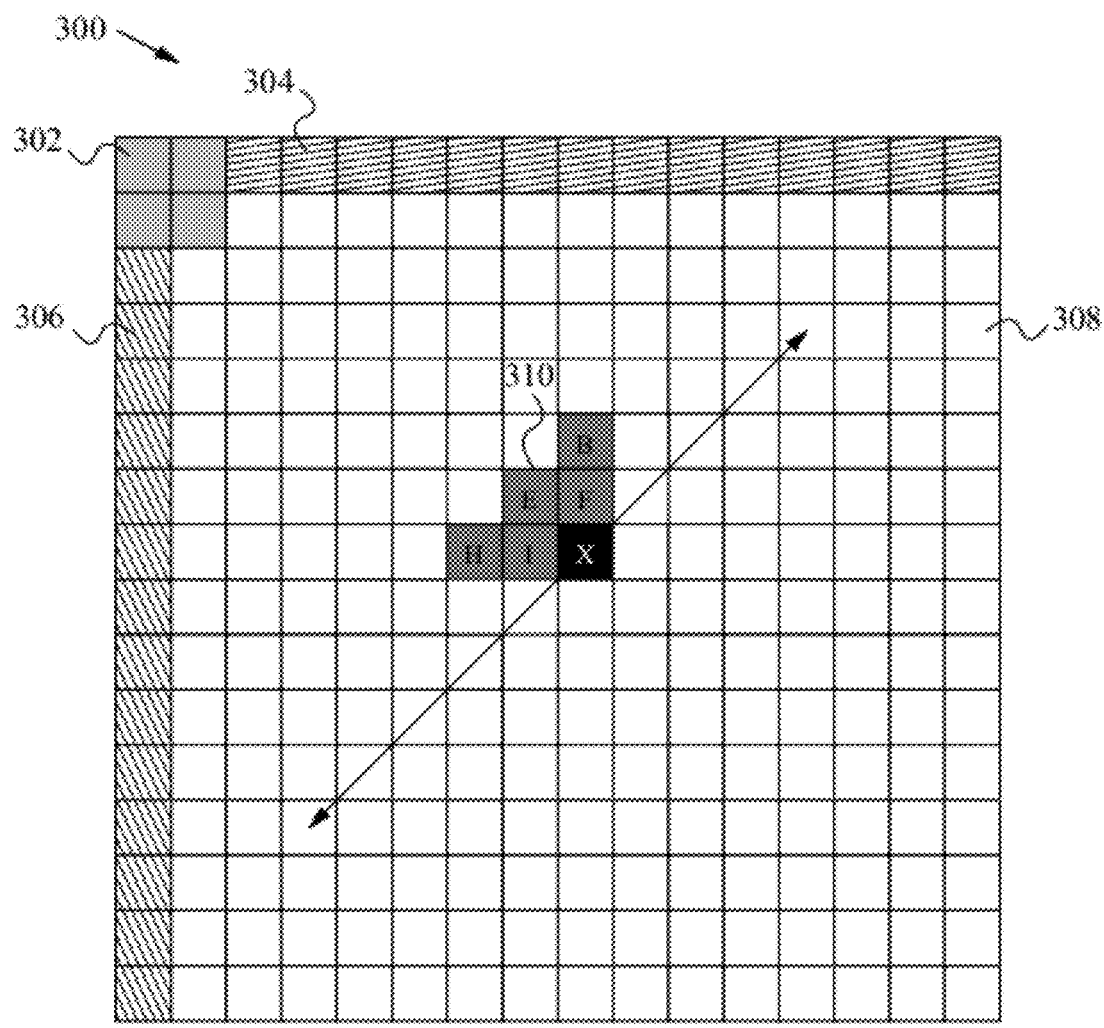
FIGS. 3A-C illustrate diagrams of a context of a significance map according to some embodiments.

A parallel processing-friendly simplified context selection of a significance map is described in FIG. 3A. The significance map 300 includes region 302 where each position has its context, region 304 shares 3 contexts, region 306 shares another 3 contexts and region 308 shares 5 contexts. A context mask 310 includes pixels near position X. The context selection of X is based on the sum of the significance of a maximum of the 5 positions B, E, F, H and I. Since X is independent on position of other positions on the same diagonal line along the scan direction, the context of the significance of the pixels along a diagonal line in scan order is able to be computed in parallel. Code of a fast implementation is shown below.

```
UInt TComTrQuant::getSigCtxInc    ( const UInt     UInt uiPosX,
                                    const UInt     uiPosY,
                                    const UInt     uiLog2BlkSize,
                                    const UChar*   sigBitMap)
{
    UInt uiCtxInc = 0;
    const Uchar* pSigBitMap = &sigBitMap[uiPosY*64+uiPosX];
    if (uiLog2BlkSize <= 3)
    {
        UInt uiShift = max<UInt>(0,uiLog2BlkSize – 2);
        uiCtxInc = ( (uiPosY >> uiShift) << 2) + (uiPosX >> uiShift);
    }
    else
    {
        if (uiPosX <= 1 && uiPosY <=1)
        {
            uiCtxInc = (uiPosY << 1) + uiPosX;
        }
        else
        {
            if (uiPosY == 0)
            {
                UInt uiCnt2 = pSigBitMap[–2] + pSigBitMap[–1];
                uiCtxInc = 4 + uiCnt2;
            }
            else if (uiPosX == 0)
            {
                UInt uiCnt2 = pSigBitMap [–64] + pSigBitMap[–64*2];
                uiCtxInc = 7 + uiCnt2;
            }
            else
            {
                UInt uiCnt2 = pSigBitMap [–64*2];
                uiCnt2 += pSigBitMap[–65] + pSigBitMap[–64*1];
                uiCnt2 += pSigBitMap[–2] + pSigBitMap[–1];
                uiCtxInc = 10 + min<UInt>(4, uiCnt2);
            }
        }
    }
    return uiCtxInc;
}
```

Figure 3B:
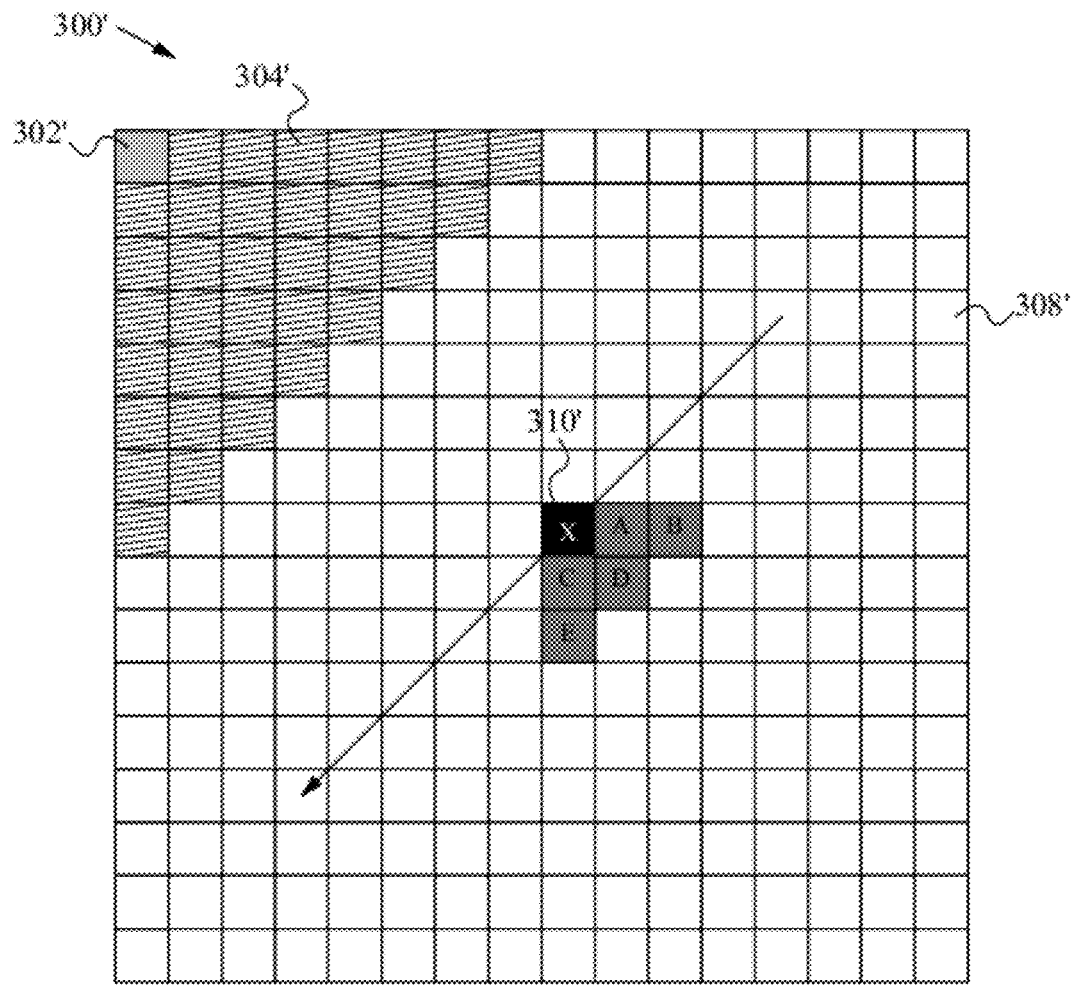

A parallel processing-friendly simplified context selection of a significance map is illustrated in FIG. 3B. The significance map 300' includes region 302' where each position has its context, region 308' shares a multiple of contexts and region 304' shares a multiple of contexts. A context mask 310' includes pixels near position X. The context selection of X is based on the sum of the significance of a subset of the 5 positions: A, B, C, D, E. When the position A, B, C, D, or E is outside the significance map, the corresponding significance is assumed to be zero. Since X is independent on position of other positions on the same diagonal line along the scan direction, the context of the significance of the pixels along a diagonal line in scan order is able to be computed in parallel.

Figure 3C:
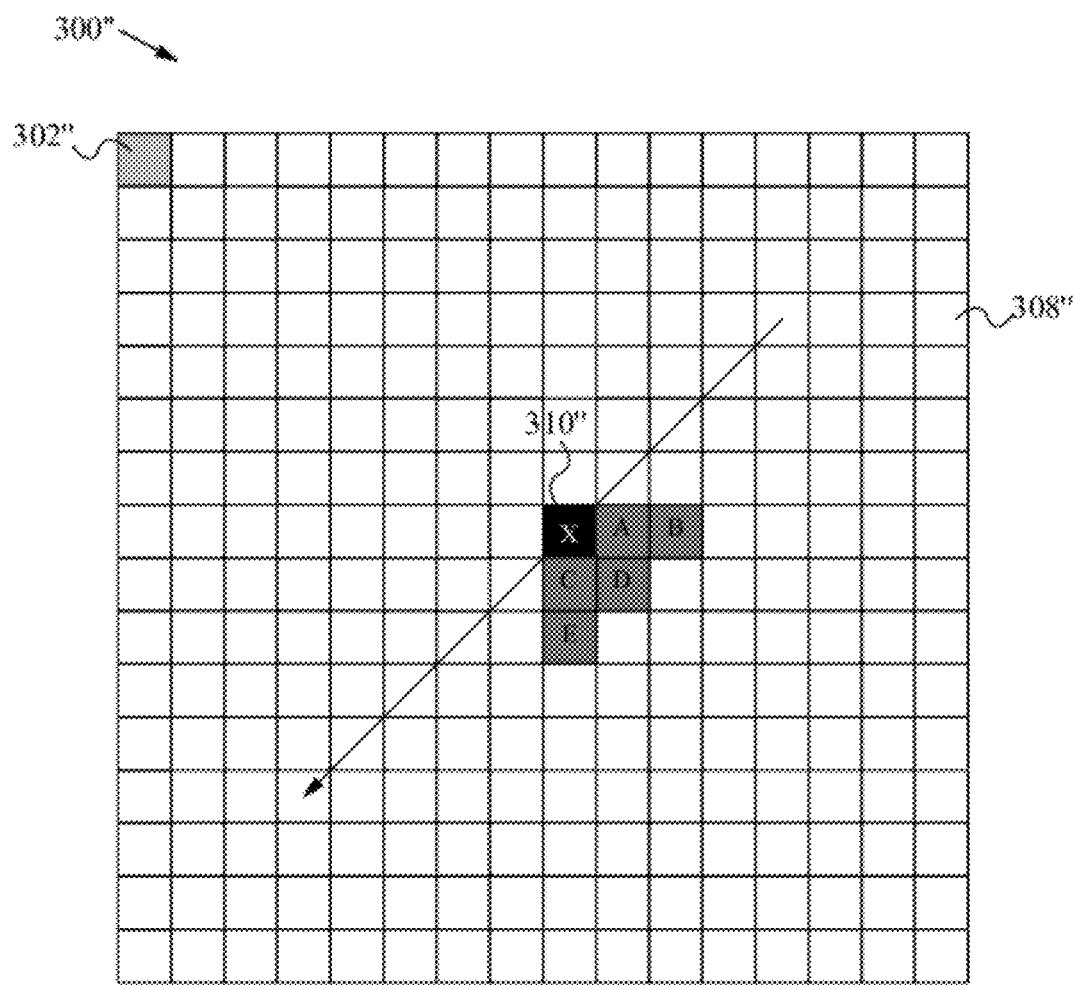

A parallel processing-friendly simplified context selection of a significance map is illustrated in FIG. 3C. The significance map 300" includes region 302" where each position has its context, region 308" shares a multiple of contexts. A context mask 310" includes pixels near position X. The context selection of X is based on the sum of the significance of a subset of the 5 positions A, B, C, D, E. When the position A, B, C, D, or E is outside the significance map, the corresponding significance is assumed to be zero. Since X is independent on position of other positions on the same diagonal line along the scan direction, the context of the significance of the pixels along a diagonal line in scan order is able to be computed in parallel.

Figure 4:
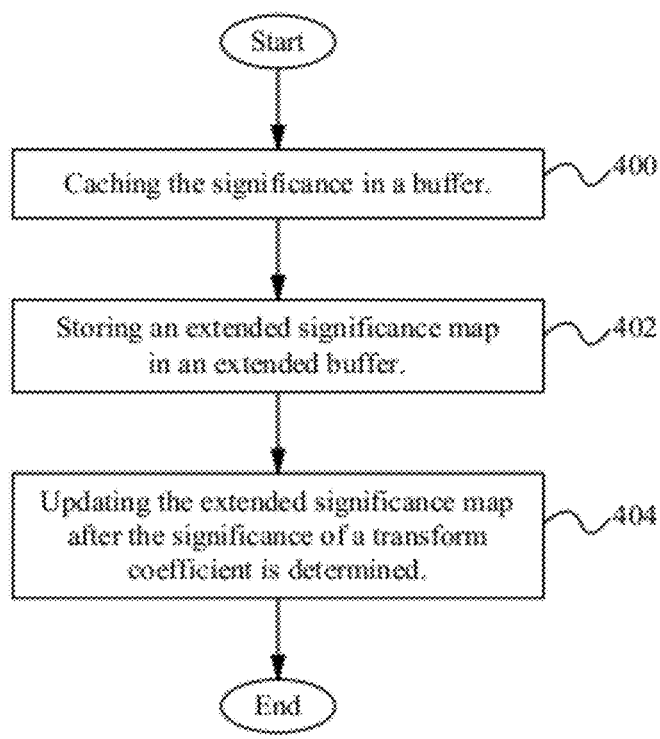
FIG. 4 illustrates a flowchart of a method of implementing a fast implementation of context selection of a significance map according to some embodiments.

FIG. 4 shows a flowchart of a method of speeding up context selection of a significance map according to some embodiments. In the step 400, the significance of each coefficient is cached in a buffer. In the step 402, an extended significance map is stored in an extended buffer. In the step 404, the extended significance map is updated after the significance of a transform coefficient is determined by the encoder or the decoder. In some embodiments, fewer or more steps are implemented. In some embodiments, the order of the steps is modified.

Figure 5:
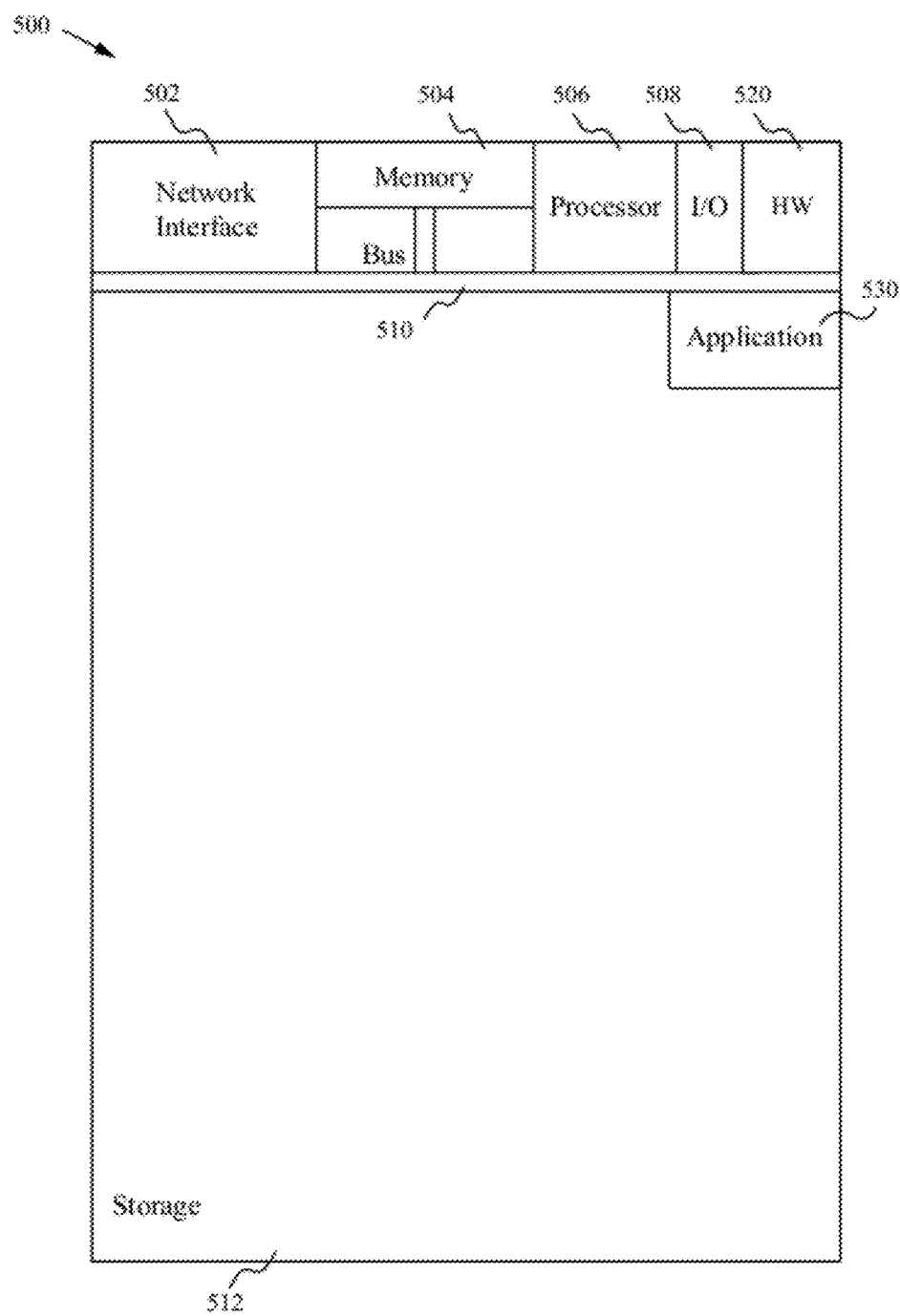
FIG. 5 illustrates a block diagram of an exemplary computing device configured to implement the fast implementation of context selection of a significance map according to some embodiments.

FIG. 5 illustrates a block diagram of an exemplary computing device 500 configured to implement the fast implementation of context selection of a significance map according to some embodiments. The computing device 500 is able to be used to acquire, store, compute, process, communicate and/or display information such as images, videos and audio. For example, a computing device 500 is able to be used to acquire and store an image. The fast implementation of context selection of a significance map is typically used during or after acquiring images. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, Blu-Ray®, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. In some embodiments, the hardware structure includes multiple processors and other hardware to perform parallel processing. Fast implementation of context selection of a significance map application(s) 530 used to perform context selection of a significance map are likely to be stored in the storage device 512 and memory 504 and processed as applications are typically processed. More or fewer components shown in FIG. 5 are able to be included in the computing device 500. In some embodiments, fast implementation of context selection of a significance map hardware 520 is included. Although the computing device 500 in FIG. 5 includes applications 530 and hardware 520 for implementing the fast implementation of context selection of a significance map, the fast implementation of context selection of a significance map is able to be implemented on a computing device in hardware, firmware, software or any combination thereof. For example, in some embodiments, the fast implementation of context selection of a significance map applications 530 are programmed in a memory and executed using a processor. In another example, in some embodiments, the fast implementation of context selection of a significance map hardware 520 is programmed hardware logic including gates specifically designed to implement the method.

In some embodiments, the fast implementation of context selection of a significance map application(s) 530 include several applications and/or modules. In some embodiments, modules include one or more sub-modules as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

In some embodiments, context selection of a significance map is computed using one or more lookup tables, one or more trees and/or any other data structure.

In a hardware implementation, the extended significance map is stored in a bit map. In a software implementation, the extended significance map is stored in an array of bytes.

To utilize the fast implementation of context selection of a significance map, a device such as a digital camera is able to be used to acquire a video or image. The fast implementation of context selection of a significance map is automatically used for performing image/video processing. The fast implementation of context selection of a significance map is able to be implemented automatically without user involvement.

In operation, the fast implementation of context selection of a significance map enables faster processing of information by caching the significance of each coefficient in a buffer, storing an extended significance map in an extended buffer and updating the extended significance map after the significance of a transform coefficient is determined by the encoder or the decoder. Potential applications of this implementation include use with the HEVC codec.

Some Embodiments of a Fast Implementation of Context Selection of Significance Map 1. A method of implementing context selection of a significance map programmed in a memory of a device comprising:
   a. selecting a five point neighborhood of a position;
   b. if a point in the five point neighborhood of the position is outside the significance map, assuming a significance of the point to be zero;
   c. computing a sum of the significance of a subset of the five point neighborhood; and
   d. determining a context based on the sum.
2. The method of clause 1 wherein the five point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts.
3. The method of clause 1 wherein the five point neighborhood of the position includes a first pixel to the right of the position, a second pixel to the right of the first pixel, a third pixel below the first pixel, a fourth pixel below the position and a fifth pixel below the fourth pixel.
4. The method of clause 1 wherein the five point neighborhood of the position includes a first pixel to the left of the position, a second pixel to the left of the first pixel, a third pixel above the first pixel, a fourth pixel above the position and a fifth pixel above the fourth pixel.
5. A method of implementing context selection of a significance map programmed in a memory of a device comprising:
   a. selecting a multi-point neighborhood of a position;
   b. if a point in the multi-point neighborhood of the position is outside the significance map, assuming a significance of the point to be zero;
   c. computing a sum of the significance of a subset of the multi-point neighborhood; and d. determining a context based on the sum.
6. The method of clause 5 wherein the multi-point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts.
7. The method of clause 5 wherein the multi-point neighborhood of the position includes a first pixel to the right of the position, a second pixel to the right of the first pixel, a third pixel below the first pixel, a fourth pixel below the position and a fifth pixel below the fourth pixel.
8. The method of clause 5 wherein the multi-point neighborhood of the position includes a first pixel to the left of the position, a second pixel to the left of the first pixel, a third pixel above the first pixel, a fourth pixel above the position and a fifth pixel above the fourth pixel.
9. A method of implementing context selection of a significance map programmed in a memory of a device comprising:
   a. caching a significance of coefficients in an extended buffer;
   b. storing an extended significance map in the extended buffer; and
   c. updating the extended significance map after the significance of a transform coefficient is determined.
10. The method of clause 9 wherein the significance of the transform coefficient is determined by an encoder.
11. The method of clause 9 wherein the significance of the transform coefficient is determined by a decoder.
12. The method of clause 9 wherein the context selection is based on a sum of a subset of neighboring pixels.
13. The method of clause 12 wherein the context of the significance of the subset of the pixels along a diagonal line in scan order is computed in parallel.
14. The method of clause 9 wherein the extended buffer is initialized to zero.
15. The method of clause 9 wherein the extended significance map is stored in a bit map.
16. The method of clause 9 wherein the extended significance map is stored in an array.
17. The method of clause 9 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
18. An apparatus comprising:
   a. a memory for storing an application, the application for:
      i. caching a significance of coefficients in an extended buffer;
      ii. storing an extended significance map in the extended buffer; and
      iii. updating the extended significance map after the significance of a transform coefficient is determined; and
   b. a processing component coupled to the memory, the processing component configured for processing the application.
19. The apparatus of clause 18 wherein the significance of the transform coefficient is determined by an encoder.
20. The apparatus of clause 18 wherein the significance of the transform coefficient is determined by a decoder.
21. The apparatus of clause 18 wherein the context selection is based on a sum of a subset of neighboring pixels.
22. The apparatus of clause 21 wherein the context of the significance of the subset of the pixels along a diagonal line in scan order is computed in parallel.
23. The apparatus of clause 18 wherein the extended buffer is initialized to zero.
24. The apparatus of clause 18 wherein the extended significance map is stored in a bit map.
25. The apparatus of clause 18 wherein the extended significance map is stored in an array.
26. The apparatus of clause 18 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.
27. An encoder comprising:
   a. a memory for storing an application, the application for:
      i. caching a significance of coefficients in an extended buffer;
      ii. storing an extended significance map in the extended buffer; and
      iii. updating the extended significance map after the significance of a transform coefficient is determined; and
   b. a processing component coupled to the memory, the processing component configured for processing the application.
28. The encoder of clause 27 wherein the context selection is based on a sum of a subset of neighboring pixels.
29. The encoder of clause 27 wherein the context of the significance of the subset of the pixels along a diagonal line in scan order is computed in parallel.
30. The encoder of clause 27 wherein the extended buffer is initialized to zero.
31. A decoder comprising:
   a. a memory for storing an application, the application for:
      i. caching a significance of coefficients in an extended buffer;
      ii. storing an extended significance map in the extended buffer; and
      iii. updating the extended significance map after the significance of a transform coefficient is determined; and
   b. a processing component coupled to the memory, the processing component configured for processing the application.
32. The decoder of clause 31 wherein the context selection is based on a sum of a subset of neighboring pixels.
33. The decoder of clause 32 wherein the context of the significance of the subset of the pixels along a diagonal line in scan order is computed in parallel.
34. The decoder of clause 31 wherein the extended buffer is initialized to zero.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing context selection of a significance map programmed in a memory of a device comprising:
   a. selecting a five point neighborhood of a position;
   b. if a point in the five point neighborhood of the position is outside the significance map, assuming a significance of the point to be zero;
   c. computing a sum of the significance of a subset of the five point neighborhood, wherein the significance of a coefficient is computed a plurality of times and a plurality of branches are used to determine if a pixel is included in context selection according to scan direction and boundary conditions; and
   d. determining a context based on the sum.

2. The method of claim 1 wherein the five point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts.

3. The method of claim 1 wherein the five point neighborhood of the position includes a first pixel to the right of the position, a second pixel to the right of the first pixel, a third pixel below the first pixel, a fourth pixel below the position and a fifth pixel below the fourth pixel.

4. The method of claim 1 wherein the five point neighborhood of the position includes a first pixel to the left of the position, a second pixel to the left of the first pixel, a third pixel above the first pixel, a fourth pixel above the position and a fifth pixel above the fourth pixel.

5. A method of implementing context selection of a significance map programmed in a memory of a device comprising:
   a. selecting a multi-point neighborhood of a position;
   b. if a point in the multi-point neighborhood of the position is outside the significance map, assuming a significance of the point to be zero;
   c. computing a sum of the significance of a subset of the multi-point neighborhood, wherein the significance of a coefficient is computed a plurality of times and a plurality of branches are used to determine if a pixel is included in context selection according to scan direction and boundary conditions; and
   d. determining a context based on the sum.

6. The method of claim 5 wherein the multi-point neighborhood of the position includes a first pixel to the right of the position, a second pixel to the right of the first pixel, a third pixel below the first pixel, a fourth pixel below the position and a fifth pixel below the fourth pixel, and a region in the upper left corner of a block shares a multiple of contexts.

7. The method of claim 5 wherein the multi-point neighborhood of the position includes a first pixel to the right of the position, a second pixel to the right of the first pixel, a third pixel below the first pixel, a fourth pixel below the position and a fifth pixel below the fourth pixel.

8. The method of claim 5 wherein the multi-point neighborhood of the position includes a first pixel to the left of the position, a second pixel to the left of the first pixel, a third pixel above the first pixel, a fourth pixel above the position and a fifth pixel above the fourth pixel.

* * * * *